United States Patent [19]

Mertens et al.

[11] Patent Number: 5,717,389
[45] Date of Patent: Feb. 10, 1998

[54] METHOD OF DETERMINING TOLL CHARGES FOR VEHICLES USING A TRAFFIC ROUTE

[75] Inventors: Reinhold Mertens, Pegnitz; Werner Kremer, Bad Honnef; Uwe Pertz, Bergheim, all of Germany

[73] Assignee: DeTeMobil Deutsche Telekom MobilNet GmbH, Germany

[21] Appl. No.: 676,314

[22] PCT Filed: Jan. 27, 1995

[86] PCT No.: PCT/DE95/00104

§ 371 Date: Sep. 16, 1996

§ 102(e) Date: Sep. 16, 1996

[87] PCT Pub. No.: WO95/20748

PCT Pub. Date: Aug. 3, 1995

[30] Foreign Application Priority Data

Jan. 28, 1994 [DE] Germany ............... 44 02 614.5

[51] Int. Cl.⁶ .................................. G06F 165/00
[52] U.S. Cl. .................... 340/928; 340/905; 340/988; 340/995; 364/449.1; 364/449.7; 235/384
[58] Field of Search .................. 340/905, 907, 340/928, 933, 988, 990, 995; 364/449.1, 444.1, 449.2, 449.7, 449.8; 235/384

[56] References Cited

U.S. PATENT DOCUMENTS

| | | | |
|---|---|---|---|
| 4,920,340 | 4/1990 | Mizuno | 340/905 |
| 5,490,079 | 2/1996 | Sharpe et al. | 364/447 |
| 5,506,774 | 4/1996 | Nobe et al. | 340/995 |
| 5,537,324 | 7/1996 | Nimura et al. | 340/990 |
| 5,568,390 | 10/1996 | Hirata et al. | 340/990 |

*Primary Examiner*—Jeffery Hofsass
*Assistant Examiner*—Edward Lefkowitz
*Attorney, Agent, or Firm*—Peter Riebling

[57] ABSTRACT

In the proposed method of determining toll charges for vehicles using a traffic route, a radiolocation system is used to compare a vehicle's geographical location continuously with the geographical location of virtual collection points. The virtual collection points are formed by data acquisition sectors extending over predetermined distances in the direction of each route.

7 Claims, 2 Drawing Sheets

ERSATZBLATT

METHOD OF DETERMINING TOLL CHARGES FOR VEHICLES USING A TRAFFIC ROUTE

BACKGROUND OF THE INVENTION

1. Field of the Invention

The invention concerns a method of determining toll charges for vehicles using a traffic route, whereby the geographical position of a vehicle is continuously determined using radiolocation, in particular using the Global Positioning System (GPS system), and compared with geographical positions of virtual collection points.

2. Description of the Prior Art

Various methods have become known for the collection of use fees (toll) for traffic routes, in particular roads. To date, only toll stations at which the vehicles stop and may use the toll road after payment of the toll have found common use. On heavily traveled roads, this results in traffic jams despite a large number of individual payment booths. Even arrangements where one throws a coin into a funnel while driving slowly provide only limited relief.

A data acquisition system described in VDI Nachrichten of Aug. 20, 1993, pages 2–3 uses a position determination of the vehicle using the GPS system, with which a position determination is made by satellites. With it, only virtual collection points are required such that the outlay for specific structures is eliminated.

The patent application "Method and Arrangement To Determine Tolls for Traffic Routes and/or Traffic Areas" simultaneously filed by the applicant further concerns a method whereby the GPS system is also used. The position determination using the GPS system has a measurement error of approx. 100 m. For the issue of toll collection it is however important, for example, whether a vehicle is traveling on a toll road or on a free road running in the vicinity of the toll road.

SUMMARY OF THE INVENTION

The object of the present invention is to enable a reliable determination, using a radiolocation system, as to whether a vehicle is passing a collection point.

This object is accomplished according to the invention in that the virtual collection points of acquisition sectors which extend for predetermined lengths in the direction of the respective traffic route are formed.

For the execution of the method according to the invention, a computer which performs the comparison for which the positions of the acquisition sector must be available is preferably disposed in the vehicle. This may take place in that all positions are stored in the computer or that only positions of collection points in a limited area are stored and positions of additional collection points may be added as needed via a data communications system.

A first embodiment of the method according to the invention is characterized in that in each case an acquisition sector consists of a plurality of reference points defined by their geographical positions, the distance between which is smaller than the measuring error of the radiolocation system. Preferably, provision is made that in each case some of the reference points of an acquisition sector form a reference group.

For evaluation of the comparison, provision may be made that a vehicle is considered to have passed the collection point if all reference points or all reference groups have a distance from positions determined for the vehicle which is less than a predefined distance.

In a second embodiment of the method according to the invention, it is alternatively possible to save memory space through the fact that the collection points consist of one or a plurality of reference points defined by their geographical position and a function characterizing the course of the road within the acquisition sector (straight line, curve). An evaluation may be carried out in that a vehicle is considered as having passed the collection point if none of the points of the curve lie farther than the measuring error of the radiolocation system from one of the continuously determined geographical positions of the vehicle.

The continuous checking as to whether the vehicle is located in one of the possibly many acquisition sectors requires a significant computational expenditure. This is in conflict with the fact that rapid calculation is necessary at the time of passage through an acquisition sector. In an improvement of the method according to the invention, provision is thus made that before a check as to whether the vehicle is located in the acquisition sector, a check is made by positional comparison as to whether the vehicle is in a zone of a larger area substantially surrounding the acquisition sector. The zone of larger area is preferably a rectangle.

BRIEF DESCRIPTION OF THE DRAWINGS

Exemplary embodiments of the invention are depicted in the drawings using several figures and explained in detail in the following description.

DETAILED DESCRIPTION OF THE INVENTION

1. Model of the acquisition point

1.1 Acquisition sector as an acquisition point

Figure 1:
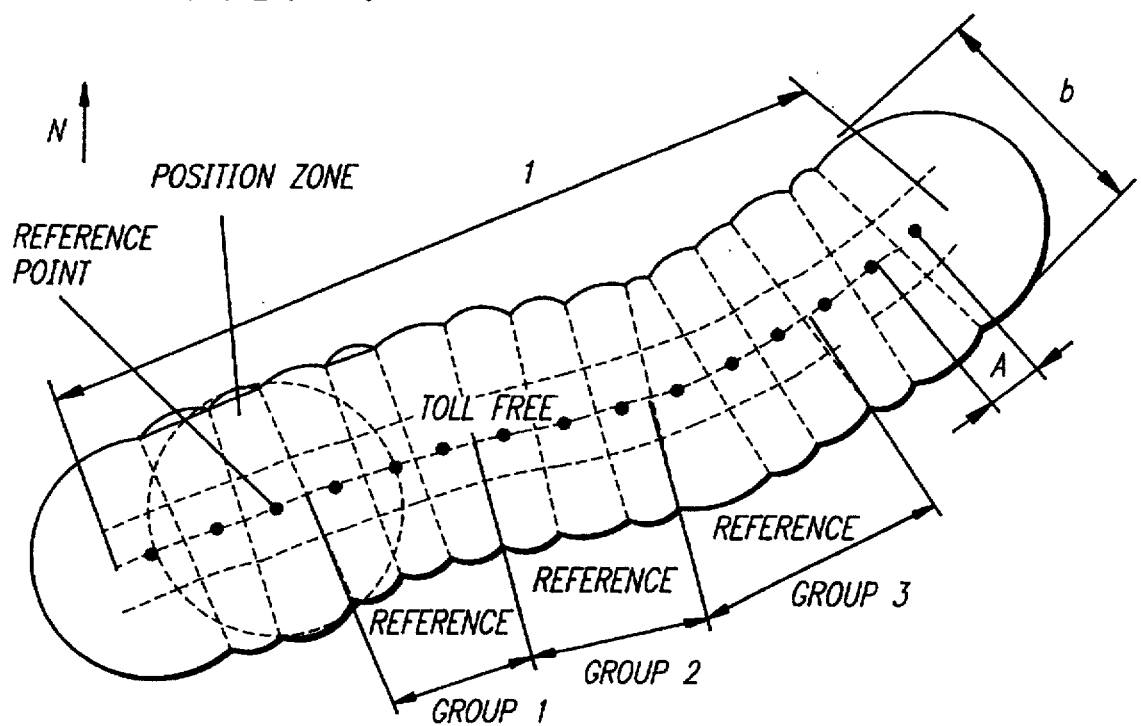
FIG. 1 is an example of an acquisition sector.

The site of toll acquisition on the toll road is generally referred to as an acquisition point. In beacon-based systems, it is technically implemented as a point system by the beacon itself. Because of the inaccuracy of position determination with GPS, it is impossible to reliably determine that a vehicle is at a specific point. In order to tolerate the inaccuracy of the GPS, the acquisition point is designed not as a point, but rather in the form of an area as an acquisition sector (FIG. 1). The chain of reference points is called an acquisition sector. The current GPS measured values are compared with the reference points. Each reference point n (n=1 ... N) is defined by its coordinates:

Longitude of the reference point Ln [°/'/"] [real°]

Latitude of the reference point Bn [°/'/"] [real°]

The definition of the reference points occurs at the time of the establishment of the acquisition sector. Section 1.4 is specially devoted to this group of problems. The number and disposition of the reference points in the acquisition sector depends on:

- the time interval between the position measurements,
- the maximum driving speed on the section of the toll road,
- the shape of the fuzzy characteristic curve in the fuzzy decision model of the tracking algorithm (Section 2.2.5), an acceptable outlay for the storage of reference point coordinates, an acceptable outlay of computational time for the assignment to a reference point in the measurement algorithm (first part of the tracking algorithm).

The overall large number of reference points is necessary since at high speed one quickly passes an individual point and can already be located at a very great distance from it. Multiple reference points with OR-gates remedy this. It is then immaterial which reference point [of one reference group (Section 1.2)] one has approached, to which the assignment then occurs.

Position zones are assigned to the reference points. They take into account the fuzziness of the position determination in that surrounding measurement values are "captured". The position zones have the shape of truncated circles. The respective secants correspond to the perpendicular dropped in the midpoint between adjacent reference points. The assignment procedure is described in Section 2.1.

All position zones of the acquisition sector form a caterpillar-shaped strip (FIG. 1) with the length of the strip l [m]

width of the strip b [m]=the diameter of a position zone.

The strip must be interpreted as the overlaid structure on the chain of reference points and is used by the decision algorithm (Section 2.2) for assessment of the relationship of measurement points away from the toll road/near the toll road, which is an important indicator for toll collection. The length depends on the number of reference points in the acquisition sector N distance between the reference points A [m].

The strip width/the diameter of a position zone must be clearly larger than the distance between the reference points (A<b), so that the strip indentations are adequately small.

The longer the acquisition sector selected, the greater the certainty that vehicles on intersecting, tangential, or parallel roads are excluded from the toll collection. In contrast, a vehicle on the toll road must pass through the strip in its entire length, before the decision concerning toll collection is reached. Thus, it may be completely adequate for a toll road section in an isolated wooded area that the acquisition sector includes only 6 to 8 reference points. In contrast, with many intersecting and tangential streets and roads, it must be lengthened approx. 3- to 8-fold, if the necessary certainty of tracking is to be maintained.

The definition of the structural parameters of the acquisition sector cannot be described in detail until Section 6.

Figure 2:
FIG. 2 is a schematic depiction of two acquisition sectors for one direction of travel each and one acquisition sector for both directions of travel.

The acquisition sectors may be designed in the open AGE (aerospace ground equipment) system (FIG. 2)

in pairs on one side (valid only for one lane of traffic)

on two sides (valid for both lanes of traffic).

It must be noted as an important constraint that acquisition sectors may not overlap if the tracking algorithm proposed here is to operate. For open AGE systems this presents no greater restriction of the freedom of the design, since with these the acquisition sectors are disposed between the (toll road) access points. For closed AGE systems, the question arises as to whether reliable acquisition sectors can actually be established with the "simple GPS" on the very short on- (or off) ramps of the toll roads. The tolerances of the position determination are very high; such that the differential GPS seems more suitable.

1.2 Formation of Reference Groups

For the decision algorithm (second part of the tracking algorithm), the reference points are broken down into reference groups, whereby each reference group includes approx. the same number of reference points, which are logically OR-gated in the manner described. With one-sided acquisition sectors, the numbering of the reference groups is continuous in the direction of travel; with two-sided acquisition sectors, in any direction (e.g., based on the kilometer/ mile markings) (a. Section 2.2.3). The reference group g (g=1 ... G) is characterized by the number of reference points Ng and the distance between the reference points A.

The number of reference groups in the acquisition sector G is determined by the targeted reliability of the tracking of the acquisition sector, which increases with an increasing number. At the same time, the outlay for tracking increases and in particular the time before the decision concerning toll collection, as well. The number of reference groups must be defined and optimized under consideration of the actual local conditions (parallel roads, illegal exits, reception blocking). The toll acquisition must in no case cross over to parallel roads or streets. A prerequisite for a positive decision on toll collection is that at least one measurement value must lie in each effective reference group (Section 2.2.5).

The constant distance between reference points A must be maintained as a maximum value. Smaller, but also irregular distances are possible, but ineffective (Section 6). Under difficult local conditions (reception blocking by embankments, bridges, tunnels, etc.) the reference groups may be enlarged or ineffective reference groups may be incorporated, which will cause no problems for the tracking algorithm. However, the overall strip length increases and with it the time before a decision about the toll collection is made. Measurement values entered in ineffective reference groups are not included for the decision algorithm (Section 2.2)

1.3 Overlaid Umbrella Zones

Figure 3:
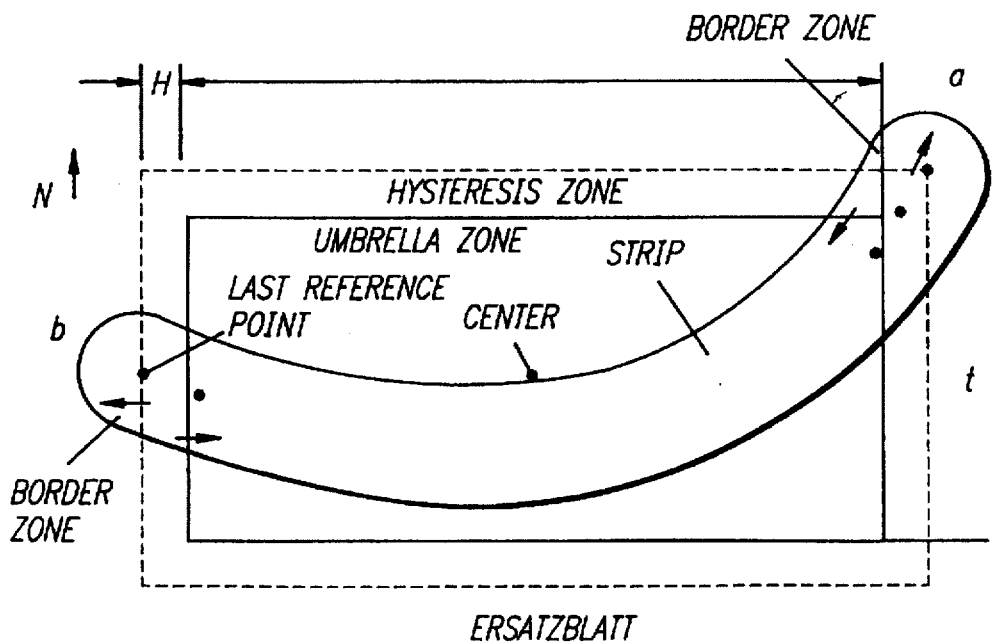
FIG. 3 is another depiction of an acquisition sector along with a zone of a larger area—hereinafter referred to as an umbrella zone—and FIG. 4 is a fuzzy characteristic curve.

For the effective functioning of the tracking algorithm, an additional model structure which is laid over the entire acquisition sector must be provided. The umbrella zone is rectangular and encloses the strip of an acquisition sector completely with the exception of certain edge zones (FIG. 3). It is, in principle, a practical approximation of the strip. The caterpillar shape is overlaid with a rectangle whose sides are determined by the longitudinal and latitudinal circles.

The rectangular umbrella zones enable a very simple check as to whether one is actually in the vicinity of reference points, i.e., of an acquisition sector. With the caterpillar-shaped strip, the outlay of computational time and comparison data would be incomparably higher. With approx. 4,000 acquisition points on the toll roads of Germany, rapid recognition of the acquisition sector is very important. The center of the umbrella zone lies at the point of intersection of the diagonals. The umbrella zone is described by the following characteristic values:

Longitude of the center L [°/'/"] [real°],

Latitude of the center B [°/'/"] [real°],

Length of the umbrella zone l [m],

Width of the umbrella zone b [m].

A hysteresis zone is also placed around the umbrella zone so that the measurement algorithm functions properly and is robust with regard to slight position changes.

The hysteresis H [m] is in the width of the border. It should start at 10 m<H <50 m. Random lateral excursions greater than 50 m to the sides of the line of the toll road are rare. Smaller values have a negative effect on the tracking algorithm only to the extent that misactivations of the decision algorithm may occur more often through brief driving into and out of the umbrella zone if the direction of travel follows the edge of the zone. Then costly calculation time is wasted.

FIG. 3 also depicts the definition of the boundaries of the hysteresis and the umbrella zone. The outer limit of the hysteresis zone runs through the last reference point of the strip. The justification for that is reported in Section 2.1.4. Case a describes a corner; case b, an edge of the hysteresis zone. The width of the border is uniquely reported as H. All reference points whose position zone is not completely within the umbrella zone are grouped together as ineffective border reference groups.

2. Algorithm for Tracking With GPS

2.1 Measurement Algorithm

2.1.1 Continuous Measurement of Position

The entire algorithm for measurement of toll acquisition points is based on the continuous determination of position using the GPS. The measurement interval T between two position determinations depends on the GPS receiver used. With the currently available receivers the measurement intervals are between 0.5 s and 1 s. Longer measurement intervals are conceivable since the speed of travel v on toll roads is very high.

Speed limits in the region of the toll acquisition points must not be assumed such that vmax=216 km/h=60 m/s was used for the maximum speed of travel. Then, in the measurement interval of 0.5 s a distance of approx. 30 m is traveled. With a measurement interval of 1 s, that would be 60 m.

2.1.2 Entering the Umbrella Zone and Leaving the Hysteresis Zone

In the basic state, the vehicle is located far outside any toll acquisition points on toll roads. This state is called OUT in the measurement algorithm. The opposite is the state IN, when the position of the vehicle is within an umbrella zone or a hysteresis zone.

Transition from OUT to IN:

The instantaneous measured value consisting of longitude and latitude coordinates is compared with the centers of all umbrella zones. An umbrella zone is entered when the following is true:

$$K_L \cdot |L - A| \leq \frac{\lambda}{2} \text{ UND } K_B \cdot |B - B| \leq \frac{\beta}{2} \quad (2.11)$$

The index of the umbrella zone (acquisition sector) is determined; thereafter the reference data for all position zones of the acquisition sector are loaded.

Transition from IN to OUT:

The instantaneous measured value consisting of longitude and latitude coordinates is compared with the center of the current umbrella zone or hysteresis zone. Not until the following is true:

$$K_L \cdot |L - A| > \frac{\lambda}{2} + H \text{ ODER } K_B \cdot |B - B| > \frac{\beta}{2} + H \quad (2.2)$$

does the algorithm switch into the intermediate state OUT_PROVE. The number of immediately consecutive measurement points for which the relationship (2.2) must be met before the change from the state OUT_PROVE into the state OUT occurs is called the acknowledgment value C. Depending on the hysteresis, the parameter is preferably in a range 1 ... 5.

After the definitive transition from IN (or OUT_PROVE) to OUT, the decision algorithm is activated. This brief state, in which the decision algorithm runs, is called OUT_DECIDE. The overall picture of the algorithm as a flow chart is included in Section 2.3.

The coefficients used in the formulas (2.1) and (2.2) are the conversion factor [real°]→[m] for longitude differences
KL≈72,000 the conversion factor [real°]→[m] for latitude differences
KB≈108,000 the circumference of the earth=the radius of the earth·2π=
6.378,000 m·2π=40,074,155 m 1/10 arc second of latitude=the circumference of the earth/
360/36,000=3.092 m≈3 m 1/10 arc second of longitude at the 50th parallel=3.092 m·cos 50°=1.987 m≈2 m Rounding off to whole numbers provides speed advantages in the computer conversion.

2.1.3 Assignment of the Measured Values to the Reference Points

In the state IN, the instantaneous measured value, consisting of longitude and latitude coordinates, is compared with all reference points of the strip. The radial distance from each reference point is determined with:

$$R_n = \sqrt{[K_L(L-L_n)]^2 + [K_B(B-B_n)]^2} \quad (2.3)$$

Then, the question must be answered: in the environment of which reference point does the position measured lie? The minimum value of all Rn is considered as the criterion for this. The overlaying of the position zones (FIG. 1) yields a geometric interpretation. The perpendicular constructed in the midpoint between two adjacent reference points indicates whether the assignment is to one or the other of the reference points. It is important to say that the assignment of measured values occurs first in the crosswise direction to the toll road beyond the position zones if they lie within the umbrella or hysteresis zone. These assignment values have, however, only temporary significance for the measurement algorithm since the decision algorithm will ignore them with its averages (Section 2.2.5). The premature limitation to the position zones would distort the consideration of the precision of the measured values.

The radial distance is modified using the following equation:

$$\rho_n = R_n[1 + \eta_E(P-1)] \quad (2.4)$$

The parameters obtained are:

modified radial distance rn precision P precision influence coefficient hE

The measured value is assigned to the reference point to which the radial distance is the shortest. The relationship (2.4) requires clarification. There are lateral excursions and lateral outliers which correlate, however, with an increased PDOP (reduction in precision). They can become dangerous when vehicles travel on parallel roads and outliers can be found in all reference groups which are in the immediate vicinity of the toll road. The proposed modification represents a possibility of better weighing near measured values with high PDOP and far measured values with low PDOP against each other. Near measured values with low and average PDOP, as are present with driving on the toll road are emphasized more.

The idea of linking lateral and radial distance and PDOP can be implemented only empirically. The analytical connections are too complicated to be acquired with reasonable outlays. The PDOP is first converted to precision using the following relationship:

$$P = \eta_U \cdot PDOP = \begin{cases} PDOP; & \text{wenn Sat\# } = 4 \\ (1.15\ldots 1.35) \cdot PDCP; & \text{wenn Sat\# } = 3 \end{cases} \quad (2.5)$$

Thus 3D and 2D measurements are compared. The parameter included is called the precision conversion coefficient hU. Another possibility is to obtain the precision in general through the HDOP.

The modified radial distance is identical to the actual radial distance for a precision influence coefficient hE=0. The precision influence coefficient strengthens and attenuates the effect of multiplication by the precision.

hE=0: no modification, r=R
hE<1: attenuated modification
hE>1: strengthened modification The modified radial distance is used only in the measurement algorithm and in the compression of the measured values in the decision algorithm (Section 2.2.2), but not with the fuzzy logic decision concerning the toll collection (Section 2.2.5). Example with h=0.8 and Sat #=4:

1st value: R=90 m, P=3.1 (far value with small PDOP/ higher accuracy),
2nd value: R=60 m, P=8.4 (near value with high PDOP/ lower accuracy),
90[1+0.8(3.1−1)]=241.2<60[1+0.8(8.4−1)]=415.2

The assigned value is that with the higher accuracy even if it is farther away. The random excursion in the vicinity of the toll road is eliminated since it has a high PDOP.

To accelerate the calculation operations with equations (2.3) and (2.4), the squared equations are used. The time-consuming calculation of the square root is then eliminated.

$$R_n^2 = [K_L(L-L_n)]^2 + [K_B(B-B_n)]^2 \quad (2.3)$$

$$\rho_n^2 = R_n^2 [1+\eta(P-1)]^2 \quad (2.4)$$

If a measured value is already noted for a reference point, it is compared with that just obtained. The measured value with the smaller (squared) modified radial distance is further noted. If a change in the assignment to a reference point occurs, the most recently noted value with the smallest (squared) modified radial distance is bindingly assigned to the old reference point. For the new reference point, the notation starts over again.

In the measurement algorithm, a counter F runs simultaneously, which is initialized to F0=1 upon entry into the umbrella zone and is always increased by DF =1 when the change from one reference point to another occurs. The counter reading is assigned to the reference point and is used for evaluation of the drive-through sequence in the decision algorithm (Section 2.2).

2.1.4 Processing of Positions Away From the Strip

Measured positions which still lie within the umbrella or hysteresis zone, but not in the strip are called away from the strip. They do not satisfy the condition (2.6).

$$R_n \leq \frac{b}{2} \quad \text{bzw.} \quad R_n^2 \leq \frac{b^2}{4} \quad (2.6)$$

To a large extent, they indicate that the vehicle is not traveling on the toll road. However, it is also possible that random excursions occur through influences in the measurement series which are difficult to categorize and which indicate positions outside the strip. The following measures prepare for the evaluation of these data in the decision algorithm (Section 2.2.1), in particular the determination of the strip coefficient.

Two counters J1 and J2, which are initialized at J01=0 and J02=0 upon entry into the umbrella zone, run with the measurement algorithm. The first counter refers to measured positions which lie within the strip and meet the condition (2.6), and increases by DJ1=1. The second counter refers to measured positions which lie outside the strip and do not meet the condition (2.6), and in this case increases by DJ2=1.

In order for the counting to function without corruption, the strip must extend a bit beyond the outer boundary of the hysteresis zone (FIG. 3). If the strip were shorter, there would be possible measurement positions in the zone between the end of the strip and the outer boundary of the hysteresis zone which would lie very near the toll road but are no longer assigned to any position zone. Thus the second counter would rise incorrectly and not the first. The design of the border zone is, however, not overly critical since during driving through the strip a great many positions lying within the strip are counted such that a very few lying outside are not of great significance. The rule that the outer boundary of the hysteresis zone runs through the last reference point of the strip is a simple solution for the problem described.

2.2 Decision Algorithm
2.2.1 Determination of the Strip Coefficient

The strip coefficient J is defined as:

$$J = \frac{J_1}{J_1 + J_2} \; ; \sigma \leq J \leq 1 \quad (2.7)$$

This indicates what proportion of the measurement positions included in the acquisition sector lie inside the strip. A high value near 1 indicates that the vehicle has very likely traveled on the toll road. A value under 0.5 leads to the conclusion that the vehicle has traveled parallel to the toll road for a bit and then turned away or crossed the toll road.

The comparison of the strip coefficient with the strip set point W is the first step of the decision algorithm and incorporates in principle an initial rapid rough selection as to whether the activation of the additional more complicated decision model is worthwhile. The decision algorithm is interrupted when J<W. In this case, the vehicle does not have to pay.

The definition of the strip set point W is the object of the parameter optimization (Section 6.3), it fails roughly in the range 0.6 . . . 0.9.

2.2.2 Compression of the Measurement Values in the Reference Groups

The additional decision algorithm does not work with the individual reference points, but only with the valid reference groups.

The compression of the measurement values, consisting of longitude and latitude coordinates, again occurs according to the criterion of the smallest (squared) modified radial distance. For a logical OR-gating of the reference points of a reference group, the assigned value which is nearest the reference point has the highest significance. The mathematically exact proof of this can be based on the principles of fuzzy logic.

The stored measurement value of a reference point whose modified radial distance is the smallest is used as a significant measurement value of the reference group. For this measurement value at the n-th reference point, the following parameters must be noted:

Longitude difference from the reference point δL=KL (L-Ln)

Latitude difference from the reference point δB=KB (B-Bn)

Precision (DOP)

All other measurement values are insignificant with regard to the fuzzy logic decision model (Section 2.2.5). If no measurement value at all is entered into a valid reference group, this has no effect here, but results later in a negative decision concerning toll collection. The ineffective reference groups play no further role in the compression.

The compression of the entered counter readings F (drive-through sequence) occurs according to the arithmetic mean of all stored measurement values of the reference group. The weight of the drive-through sequence Fg of the g-th reference group is calculated by:

$$F_g = \frac{1}{Mg} \sum_{i=1}^{M_i} F_i \qquad (2.8)$$

Fi—stored counter reading F of the I-th measurement value

Mg—number of measurement values in the reference group 2.2.3 Evaluation of the Drive-Through Sequence The drive-through sequence of the reference group is a significant indicator of whether the vehicle actually traveled on the toll road. Within the acquisition sector of the open system, turning is not legally possible since there are no toll road access points here. If the sequence of weights of the drive-through sequence does not increase greatly (or decrease, in the case of the two-sided acquisition sector), the vehicle must have used the roads or streets of the zone. For one-sided acquisition sectors the decreasing drive-through sequence must be ruled out.

If no weight at all of the drive-through sequence (=0) is entered in a reference group, this has no effect here, but results later in a negative decision concerning toll collection.

There is a disruption in the drive-through sequence, if with an increasing sequence the weight of the successor is greater by less than Q than that of the predecessor, with a decreasing sequence the weight of the successor is smaller by less than Q than that of the predecessor.

The decision concerning the toll collection then comes out negative.

The cutoff value Q may be considered to be the height of the step between adjacent reference groups which must be exceeded by the difference of weights of the drive-through sequences. The correct drive-through sequence is defined by the following relations:

(increasing drive-through sequence) $F_{g+1} - F_g \geq Q$ (decreasing drive-through sequence) $F_g - F_{g+1} \geq Q$ \qquad (2.9)

The definition of the cutoff value Q is the object of the parameter optimization (Section 6.7); it is roughly 1.

Examples with Q=1:

1st series: F=2.7/4.8/7.2/10.1 (strongly increasing drive-through sequence, between successive values, there is at least a difference of 1)

2nd series: F=3.2/4.0/5.9/1.8 (variable drive-through sequence, between successive values, there is twice a difference of less than 1, even once negative, i.e., a turn in the region of the toll road, but not on the toll road)

2.2.4 Testing Average Precision

The effect of precision (DOP) has already been described in Section 2.1.3. It must not occur under any circumstances that a vehicle on a parallel road ends up in toll collection, since many measurement positions with relatively poor precision (high DOP) "penetrate into the toll road". The modified radial distance is a means to reduce this possibility.

An additional means is the comparison of the average precision of all measurement positions in the IN state PIN with the average precision of all assignment values of the effective reference groups PG according to the following rule:

If PIN+P<PG, the decision concerning the toll collection is negative.

Here the precision comparison value P has a important role. If it is too small, normal fluctuations of the DOP within the measurement series of an acquisition sector are poorly compensated such that a negative decision is made too often. If it is too large, the testing of the average precision is superfluous anyway. Its meaningful value range is 1 . . . 3.

With the precision checking, one is a little more on the safe side not to incorrectly assess tolls to the vehicle. It is less problematic if a vehicle on the toll road possibly slips through the toll collection based on this rule.

Examples with P=1.5 and P=3.5:

PIN=3.22; PG=5.67

P=1.5:3.22+1.5=4.72<5.67 (negative decision due to clear DOP differences)

P=3.5:3.22+3.5=6.72>5.67 (at first no negative decision despite clear DOP differences due to large precision comparison value)

2.2.5 Fuzzy Logic Decisions Concerning Toll Collection

The principles of fuzzy logic are known. If the checking of the strip coefficient, the drive-through sequence, and the average precision produce no negative results, a decision concerning toll collection is finally made using a fuzzy logic model. It evaluates the longitude and latitude differences of all reference groups, whereby the statement concerning the proximity to the reference point is fuzzily determined with the satisfaction level of mg E [0.1] with regard to the g-th reference group.

Figure 4:
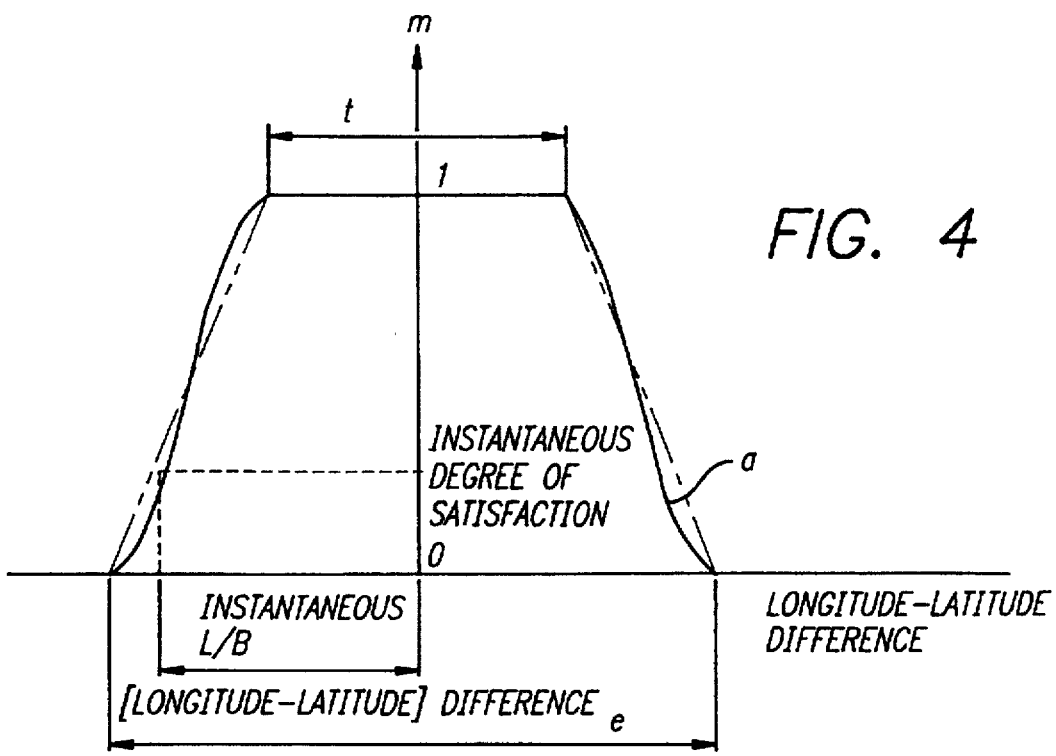

This is determined from the two fuzzy characteristic curves for longitude and latitude differences whose parameters must still be quantified individually. Both fuzzy characteristic curves should be identical in their parameters. FIG. 4 clarifies the form of such a fuzzy characteristic curve with its three critical parameters:

tolerance t width of influence e intensification of contrast a E [1.≈6]

The third parameter is not adequately clear from the illustration; it describes the degree of widening (in the upper half) or narrowing (in the bottom half) of the flanks relative to a straight line. The resulting flank curves satisfy the equation:

$$\mu = 0.5[2\mu]^\alpha; \mu < 0.5$$

$$\mu = 1 - 0.5[2(1-\mu)]^\alpha; \mu < 0.5 \qquad (2.10)$$

The shape of the fuzzy characteristic curve may be interpreted such that for small distances from the reference point a maximum degree of satisfaction of 1 (condition 100% satisfied) is fixed; for medium distances a "gray zone" with a degree of satisfaction decreasing toward the outside is used (condition satisfied up to a certain percentage rate), and for great distances the degree of satisfaction is set at 0 (condition not satisfied at all).

For each reference group g the degree of satisfaction for the longitude difference mLg the degree of satisfaction for the latitude difference mBg are determined. As depicted in FIG. 4, the longitude difference or the latitude difference is plotted on the x-axis, the point of intersection of the perpendicular constructed with the fuzzy characteristic curve is determined, and the horizontal is drawn from there to the y-axis, where the degree of satisfaction is read out. Longitude and latitude differences must be evaluated separately since the structure of the characteristic curve is derived from the separate tolerance statistics of the GPS for longitude and latitude coordinates.

The degree of satisfaction mg is determined using a fuzzy AND-gate:

$$\mu_g = \gamma MIN(\mu_{Lg}, \mu_{Bg}) + (1-\gamma) \cdot \frac{1}{2}(\mu_{Lg} + \mu_{Bg}) \quad (2.11)$$

An important role is played here by the
g-operator E [0,1],
which considers the difference between the minimum and the arithmetic mean and its precise value will be an object of the parameter optimization. The degree of satisfaction m E [0,1] with regard to the entire acquisition sector is determined by a multiple FUZZY-AND with the same g-operator as in (2.11):

$$\mu = \gamma MIN(\mu_1, \mu_2 \ldots \mu_G) + (1-\gamma) \cdot \frac{1}{G} \sum_{g=1}^{G} \mu_g \quad (2.12)$$

With this equation all reference groups are completely equally included in the decision finding. There are no individual significance factors for the individual reference groups. The equivalence of the reference groups is an important basic condition for the design of the acquisition sectors.

The last step of the decision concerning toll collection is the comparison with a set (collection) threshold S using the rule: pay if m>S, otherwise not.

The threshold value lies roughly in the range 0.6 ... 0.8. An important criterion is that in the case of a very small degree of satisfaction in a reference group (e.g., =0, if this reference group has not actually been driven through) of the degree of satisfaction with regard to the overall acquisition sector must certainly exceed the collection threshold.

Example with g = 0.5 and S = 0.7:

| | Degree of satisfaction | | | |
|---|---|---|---|---|
| | 1st R-group, | 2nd R-group, | 3rd R-group | overall |
| Degree of longitude: | 0.75 | 0.98 | 0.88 | |
| Degree of latitude: | 0.86 | 1.00 | 0.62 | |
| Together: | 0.7775 | 0.985 | 0.685 | 0.7504 > 0.7 |

The overall degree of satisfaction is above the collection threshold. Thanks to the fuzzy logic gate, the effect of the individual minimum value of 0.62 is relativized.

The flag "Pay yes/no?" is the most important output parameter of the entire tracking algorithm. It has two states:

VOID—no toll collection (basic state, "no", 0)

PAY—toll collection ("yes", 1)

In addition, the code number of the acquisition sector passed through is displayed.

What is claimed is:

1. A method of determining toll charges for the use of traffic routes by vehicles as a function of the passing of detection points disposed on the traffic routes, whereby the geographical position of a vehicle is continuously determined using radiolocation, in particular using a GPS system, and is compared with the geographical positions of virtual detection points, whose positions are stored as selected points of the traffic routes, whereby the virtual detection points are formed in each case by a strip-shaped detection sector along a chain of points on a predefined distance of the respective traffic route and that a vehicle is considered as having passed the detection point if it is determined, by a comparison of the continuously determined positions with points within the detection sector, that the vehicle has traveled through the detection sector in its entire length.

2. The method according to claim 1, wherein the chain of points comprises a plurality of reference points defined by their geographical positions, the distance between which is smaller than the measurement error of the radiolocation system, and whereby a vehicle is considered as having passed the detection point if all reference points have a distance from positions determined for the vehicle which are smaller than a predefined distance.

3. The method according to claim 1, wherein the chain of points comprises a plurality of reference points defined by their geographical positions, the distance between which is smaller than the measurement error of the radiolocation system, whereby in each case a subset of the reference points of a detection sector forms a reference group, and whereby a vehicle is considered as having passed the detection point if all reference groups have a distance from positions determined for the vehicle which are smaller than a predefined distance.

4. The method according to claim 1, wherein the chain of points comprises one or a plurality of reference points defined by their geographical position and a function characterizing the course of road within the detection sector.

5. The method according to claim 4, wherein a vehicle is considered as having passed the detection point if none of the points of the curve lies farther than the measurement error of the radiolocation system from one of the continuously determined positions of the vehicle.

6. The method according to claim 1 wherein before a check as to whether the vehicle is in the detection sector, a check is performed by position comparisons as to whether the vehicle is in a zone with a greater area substantially surrounding the detection sector.

7. The method according to claim 6, wherein the zone with a greater area is a rectangle.

* * * * *